United States Patent [19]

Molaug et al.

[11] Patent Number: 4,708,090

[45] Date of Patent: Nov. 24, 1987

[54] METHOD FOR FEEDING FISH

[75] Inventors: Ole Molaug, Bryne; Sveinung B. Havrevold, Kvernaland; Odd Skjæveland, Sandnes, all of Norway

[73] Assignee: Akva A/S, Bryne, Norway

[21] Appl. No.: 733,880

[22] Filed: May 14, 1985

[51] Int. Cl.⁴ ............................................. A01K 61/02
[52] U.S. Cl. ...................................... 119/51 R; 119/3
[58] Field of Search .................................. 119/3, 51 R

[56] References Cited

U.S. PATENT DOCUMENTS

| | | | |
|---|---|---|---|
| 4,212,268 | 7/1980 | Chapman | 119/3 X |
| 4,237,820 | 12/1980 | Müller | 119/3 X |
| 4,297,973 | 11/1981 | Knowles | 119/3 |
| 4,522,151 | 6/1985 | Arbisi et al. | 119/3 |

FOREIGN PATENT DOCUMENTS 921499 4/1982 U.S.S.R. .................................. 119/3

Primary Examiner—Robert P. Swiatek
Assistant Examiner—David L. Tarnoff
Attorney, Agent, or Firm—Schwartz, Jeffery, Schwaab, Mack, Blumenthal & Evans

[57] ABSTRACT

A method for feeding fish raised in a pisciculture environment wherein fish feed is conducted to the fish pen or enclosure carried by a stream of water. To give the feed increased buoyancy after it is introduced into the enclosure, the stream of water is oversaturated with gas, such that gas bubbles penetrate into and/or adhere to the fish feed.

7 Claims, No Drawings

METHOD FOR FEEDING FISH

The present invention relates to a method for feeding fish in a pisciculture environment.

Fish raised by pisciculture methods in mesh wires or enclosures are usually fed with food in pellet form. It is known to transport the pellets to the fish pen in a hose conducted by water under pressure. Food in the form of pellets is heavier than water, and the food that is introduced into the fish pen will therefore sink to the bottom of the sea, underneath the pen. The fish within the enclosure thus have only a limited period of time for obtaining the food. Investigations have shown that about 10–30% of the food supplied will disappear through the bottom of the enclosure without having been eaten by the fish.

A significant drawback of this feeding method is that the fish food that sinks to the bottom of the sea bed contaminates the water, and this, in time, may cause stunted growth and disease in the fish.

Another drawback of the known method of fish feeding is that the food has to be introduced at the surface of the water to give the fish maximum time to eat and ingest the food. Therefore, the fish swim up to the surface of the water to obtain the food. At low water temperatures, the coldest layers of water will be located at or near the surface. With the fish feeding methods practiced today, the fish swim up to the cold water layers, and this reduces the ability of the fish to digest the food properly and results in reduced growth.

The object of the invention is to provide a method for feeding fish in which the above drawbacks are substantially reduced.

This is obtained by transporting the feed to the site of introduction in a stream of water to which a gas, for example oxygen, has been added, whereby bubbles of gas penetrate into and/or adhere to the feed, giving the feed increased buoyancy when it reaches the feeding site.

In a further refinement of the invention, the stream of water is oversaturated with gas, preferably atomized gas particles, before the feed is added to the water.

Utilizing the feeding method of the invention, the fish feed can for example be introduced at the lower or middle section of the pisciculture enclosure. The feed thus introduced will have absorbed small bubbles of gas, and small gas bubbles will also have adhered to the feed. These bubbles of gas will make the feed buoyant. Thus, the fish feed will first rise upwardly in the enclosure before gradually sinking as more of the gas escapes into the water or air. Therefore, the fish feed will be in an area in which the fish can ingest it for a substantially longer period of time than is the case in conventional fish feeding methods.

With the method of the invention, moreover, the fish feed can be introduced in the warmest layer of the water, which will facilitate digestion of the food and promote increased growth of the fish.

A further advantage of the method of the invention is that a smaller proportion of the fish feed will sink to the bottom of the sea bed and contaminate the water. If oxygen is utilized as the buoyancy gas, the quality of the water and thereby also the growth of the fish will be further enhanced.

What is claimed is:

1. A method of feeding fish in a piscicultural environment, comprising the steps of:
   producing a stream of water oversaturated with a gas; and
   conducting feed in said oversaturated stream of water to a feeding situs;
   such that said oversaturated stream of water releases gas which adheres to the feed, thereby increasing the buoyancy of the feed.

2. The method as claimed in claim 1, wherein the stream of water is oversaturated with gas prior to the feed being introduced into the stream of water.

3. The method as claimed in claim 1, wherein the gas comprises oxygen.

4. The method as claimed in claim 1, wherein the feeding situs includes an enclosure and the stream of water is introduced below the surface of water in the enclosure.

5. A method of feeding fish in a piscicultural environment, comprising the steps of:
   producing a stream of water oversaturated with a gas comprising oxygen; and
   conducting feed in said oversaturated stream of water to an enclosure below the surface of the water in the enclosure;
   such that said oversaturated stream of water releases gas which adheres to the the feed, thereby increasing the buoyancy of the feed.

6. The method as claimed in claim 5, wherein said conducting step includes transporting the feed to the enclosure through a hose with said oversaturated stream of water being introduced under pressure.

7. The method as claimed in claim 5, wherein said enclosure includes a mesh pen.

* * * * *